Feb. 24, 1948.    H. H. REYNOLDS    2,436,403
APPARATUS FOR THICKENING HYDROSOLS
Filed June 20, 1945
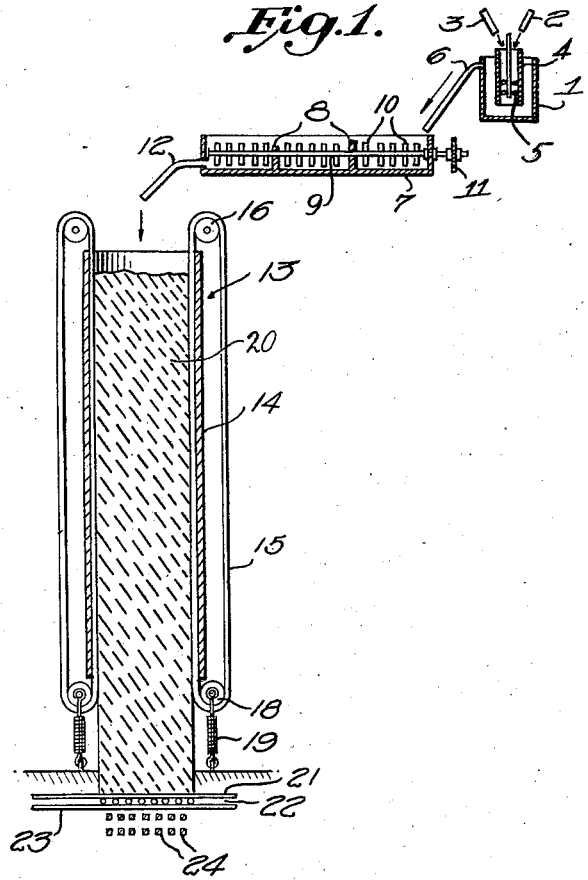
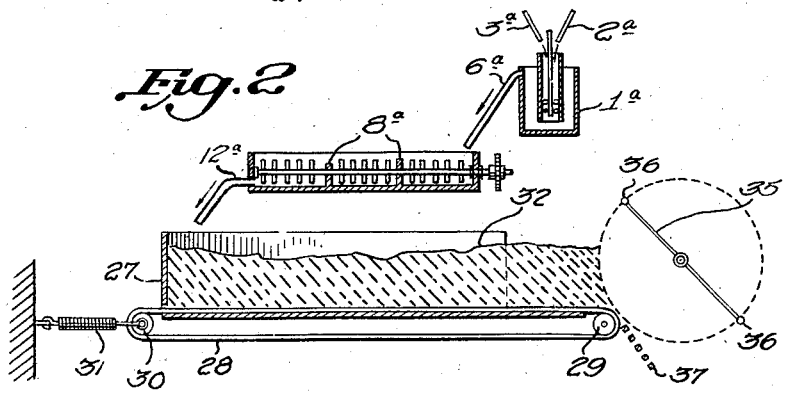
Inventor
HOWARD H. REYNOLDS
By Semmes Keegin Beale & Semmes
Attorney Patented Feb. 24, 1948

2,436,403

UNITED STATES PATENT OFFICE 2,436,403

APPARATUS FOR THICKENING HYDROSOLS

Howard H. Reynolds, Belmont, Mass., assignor to The Davison Chemical Corporation, Baltimore, Md.

Application June 20, 1945, Serial No. 600,501

3 Claims. (Cl. 252—359)

This invention relates in general to the production of an inorganic oxide hydrogel and more particularly has reference to a method of treating a hydrosol to increase its viscosity to reduce its gelling time when placed in a setting vessel.

One of the most widely used methods of preparing an inorganic oxide hydrogel such as silica hydrogel involves the mixing of a solution of sodium silicate with a solution of sulphuric acid to form a silica hydrosol. By allowing the hydrosol so formed to set for a period of time, the hydrosol is converted into a hydrogel. This setting or gelling is usually carried out by introducing the hydrosol into a setting vessel and allowing the same to remain in an undisturbed condition for a period of time sufficient to effect the gellation. This procedure is obviously of the batch type.

The major object of this invention is the preparation of a hydrogel from a hydrosol in a continuous and efficient manner.

Another object of this invention is to treat a hydrosol to form a material of semi-fluid, semi-solid consistency and continuously gelling said semi-fluid hydrosol.

Still another object of this invention is to increase the viscosity of a hydrosol.

A further object of this invention is to subject a hydrosol to agitation to facilitate the gelling thereof.

With these and other objects in view, the present invention resides in the treatment of a hydrosol to facilitate the gelling thereof in a continuous manner.

In order to facilitate an understanding of the present invention, reference is made to the accompanying drawings in which:

Figure 1 is a somewhat diagrammatic vertical sectional view of one form of apparatus suitable for carrying out the present invention.

Figure 2 is a view similar to that of Figure 1 showing a modified form of gelling apparatus employing the principle of the present invention.

In carrying out the present invention, an inorganic oxide hydrosol such as silica hydrosol is prepared and subjected to treatment for the gellation of the same. One method of preparing a silica hydrogel which is widely used comprises the mixing of a solution of sodium silicate with a solution of sulphuric acid, the mixing being effected rapidly and thoroughly to insure the production of a clear hydrosol.

The present invention contemplates the setting of the so produced hydrosol by passing the hydrosol through a gelling zone in which gellation of the hydrosol is effected during the flow of the same through the gelling zone. By continuously introducing the hydrosol into the gelling zone, there is ejected from the discharge end thereof a continuous body of hydrogel. The continuous body of hydrogel may be permitted to break up of its own accord or may be subdivided into cubes or small elements of other optimum shape for the subsequent washing, drying and activating procedures.

Referring to the drawings, two forms of apparatus suitable for carrying out the present invention have been diagrammatically illustrated. In Figure 1 there is shown a mixing vessel 1 into which conduits 2 and 3 discharge streams of sodium silicate solution and sulphuric acid solution respectively. The mixing tank 1 is provided with a cylindrical tubular baffle 4 in which is mounted an agitator 5. Tank 1 is provided with a discharge conduit 6 through which the reaction product comprising a silica hydrosol is discharged.

Silica hydrosol is a liquid and by virtue of this fact must be handled in vessels suitable for the purpose. To eliminate the consequences of this characteristic of the hydrosol to a considerable extent and to facilitate the handling of the same, the present invention contemplates the treatment of the hydrosol to convert the same into a form having a semi-fluid consistency.

In accordance with the present invention, the viscosity of the hydrosol is increased to a semi-liquid, semi-solid state by agitation. An apparatus suitable for the increase of the viscosity of the hydrosol has been shown in Figure 1 of the drawings and comprises an elongated mixing trough 7 divided by a plurality of overflow baffles or weirs 8. Two baffles 8 have been shown in the drawing but it should be understood that any desired number may be employed. The height of the baffles will progressively decrease from the inlet to the discharge end of the mixing trough 7. By providing the baffles 8, mixing or intermingling of the fresh hydrosol with the partially thickened hydrosol is prevented. A shaft 9 extends longitudinally through the mixing trough 7 and carries a plurality of agitators 10. Shaft 9 is provided with a sprocket or pulley 11 which is coupled to a suitable source of power not shown for effecting the rotation thereof. Discharge conduit 6 of the hydrosol mixer 1 feeds the freshly prepared hydrosol into the inlet end of the mixing trough 7. The flow of the hydrosol through the mixing trough, the length of the mixing trough, the number of agitating impellers and the speed of rotation of the agitator shaft 9 are correlated to increase the viscosity of the hydrosol during its flow through the trough to a semi-fluid consistency. Viscous semi-fluid, semi-solid hydrosol is discharged through the outlet 12 into a gelling zone 13.

As illustrated, the gelling zone comprises an elongated tube 14 of rectangular cross section extending vertically. Four vertical conveyor belts 15 are associated with the walls of the rectangular tube 14 as shown. With this construction, the portion of each conveyor belt within the tube serves as a lining for the wall with which it is associated. At the upper end of the tube 14 a plurality of roller pulleys 16 are positioned to support the upper loops of the conveyor belts. These pulleys are located so that the stretches of the belts within the tube will be against the walls with which they are associated.

A plurality of bevel gears (not shown) are mounted on the shafts of pulleys 16 to couple said pulleys together to insure rotation of all pulleys at the same speed. At least one of said pulleys is coupled to a power drive (not shown) to control the movement of the pulleys and the belt passing over the same. The power drive may serve to impart movement to the belts or to retard movement of the belts.

At the lower end of the tube 14 a plurality of idling pulleys 18 are provided which are mounted for adjustment toward and away from the pulleys 16 to take up slack in the belts. Pulleys 18 may be urged away from pulleys 16 by springs 19 to maintain the belts tight.

Belts 15 may be constructed of any suitable material resistant to the action of acid. Rubberized fabric is a suitable material. The exposed surfaces of the belts may be roughened or provided with cleats to insure increased adhesion between the belts and the hydrogel body formed in the gelling zone to better control the movement of the gel through said zone.

In starting the operation of the apparatus, a temporary bottom may be positioned in the lower portion of the gelling zone and fixed and sealed in place to prevent excess seepage of the viscous hydrosol from the gelling zone. If necessary, painter's tape or scotch tape may be used for sealing the temporary bottom in place. Any plastic sealing compound may also be used. If necessary, the adjoining vertical edges of the belt may likewise be sealed together. After this preliminary preparation, the belts are secured against movement and the viscous hydrosol is run into the gelling zone.

When the hydrosol in the gelling zone has set to a gel the temporary bottom is removed. The weight of the gel body 20 formed in the gelling zone is sufficient to cause a downward movement through the lower open end of said zone. However, the rate of movement of the belts 14 to which the gel body 20 adheres is controlled to limit the rate of discharge of gel from the gelling zone. The rate of discharge of the gel body 20 from the gelling zone is at such a rate that the time required for travel of the viscous sol from the upper end of the gelling zone to a region above the bottom will be adequate to effect gellation of the hydrosol. It is desirable that a sufficient height of gel be always present in the lower portion of the gelling zone to adequately support the column of unset hydrosol in the upper portion of the gelling zone.

As the mass of hydrogel 20 is discharged from the lower end of the gelling zone, it is passed through the crossed cutter wires 21 and 22. These wires which may be of stainless steel are in such number and so positioned that a plurality of thin rectangular columns of hydrogel are formed. A horizontally moving cutter wire 23 supported in a swinging or rotating frame not shown is provided for cutting the thin columns of hydrogel into small cubes 24.

As the small cubes are discharged, they are collected in water. A body of water may be positioned beneath the lower end of the gelling zone or the lower end of the gelling zone may be immersed in a bath of water. In the latter event, the subdividing of the gel body into columns and into cubes is effected beneath the surface of the water. In the case in which the lower end of the gelling zone is immersed in water, the weight of the gel body will be partly supported by hydrostatic pressure.

In either event, the gel particles will settle to the bottom of the water container and are removed therefrom for washing and further treatment.

The above described procedure is particularly suitable for continuous operation, the hydrosol being continuously formed, thickened and introduced into the gelling zone through which it continuously moves and is gelled during movement and from which it is continuously discharged as a completely gelled body. Likewise, the subdividing of the continuously discharged gel body is effected continuously and the subdivided gel is continuously removed and subjected to a continuous washing treatment in which the gel is passed countercurrently to the washing medium (water or acidulated water). The washed gel may be passed continuously through drying and activating equipment to carry the continuous aspect of the present invention throughout the complete gel making and finishing treatment.

The gelling zone may be vertically disposed as shown in Figure 1 or it may be inclined at an angle to the vertical or even be horizontal. When inclined to the vertical or horizontal it may be somewhat modified as shown in Figure 2. In this figure, parts similar to parts in Figure 1 have been designated by similar reference characters. As shown, a hydosol mixer is provided and the hydrosol is fed through outlet 6a to the inlet of trough 7a in which thickening of the hydrosol is effected as described above.

The so thickened partially set hydrosol is introduced into an open top trough-like gelling zone 27 closed at its inlet end. A conveyor belt 28 is arranged for travel over the bottom of the trough. This belt at one end of the trough passes over a power driven pulley 29 and at the other end passes over an adjustable idler pulley 30 which is urged by a spring 31 to maintain the belt under sufficient tension. In starting, the open end of the trough may be closed by a temporary closure and the trough filled with the thickened hydrosol. After the mass has gelled, the temporary closure may be removed and the conveyor belt operated to displace the gel body 32 toward the open end of the trough. From this point, the process becomes continuous and thickened hydrosol is fed to the trough as the body of gel 32 is displaced therein.

The length of a trough 27 and the speed of movement of the gel body 32 therethrough is such that ample time will elapse between the time the hydrosol leaves the inlet end of the trough and the time that it has nearly reached the discharge end thereof to effect gellation of the hydrosol into the form of a hydrogel. The length of the sides of the trough need only be sufficient to extend slightly beyond the region at which gellation of the hydrosol takes place. From this point on, the gel will be of sufficient rigidity to maintain its form.

Hydrogel formed in the trough is discharged from the open end of the trough in the form of a continuous elongated body 32. This body is moved by the conveyor belt 28 towards the cutting device 35. As illustrated, the cutting device comprises rotary arms supporting cutting wires 36 at the extremities thereof. The rotary cutting device is rotated at a predetermined speed correlated to the speed of movement of the gel body 32 to cut through slices of gel from the advancing body 32.

If desired, conveyor belts similar to belt 28 may be positioned along the sides of the open trough 27 to facilitate the movement of the hydrogel body through the trough. Under such circumstances, there will be no friction between the body of the gel and the walls of the trough.

The cutting wires and the movable cutting element are so spaced as to divide the gel body into cubes, the sides of which are about ¼ inch but obviously this size may be varied.

Operating normally with sulphuric acid of around 24 Bé. and sodium silicate also of this density and with a temperature of the solutions of approximately 90° F., the temperature of the resulting mix due to the slightly exothermic nature of the reaction is increased approximately 10 to 12° F. Under these conditions, the total setting time is approximately four hours to obtain a firm hydrogel. This means the total length of time from the mixer to the discharge point of the vertical column. The time in the thickener may be from one to two hours and the balance of the time in the gelling zone.

If desired, the cubes of gel collected may be handled sufficiently rough so that the corners are knocked off and the shape of the individual hydrogel particles will be more or less spherical. To obtain this shape, it may be necessary to pass them through a tumbling barrel either in air or in water. The fine gel knocked off from the edges is washed away either to waste or can be recovered in a suitable separate washing system. It may for instance be mulled and reset either before or after washing. In any case, the amount of fines produced will be so small that it can be initially disregarded without obtaining unduly low yield of large size gel.

No matter what method is used in rounding the cubes the fines should be separated from the large particles and this may be done either by screening or by flotation, i. e., taking advantage of the difference in settling rate of the fines and the big particles.

At the same time, as the particles are being handled and cleaned from fines, the water treatment gives this gel the preliminary washing so that a large part of the initial acid and salt is taken out (at least from the surface). This is desirable because the continuous washer is of up-flow type with the hydrogel going down.

From the foregoing description, it will be appreciated that the present invention provides a method of continuously preparing hydrogel from a hydrosol. One of the important aspects of the present invention resides in the thickening of the hydrosol into a material of semi-fluid or semi-solid consistency or in other words partially gelling the hydrosol prior to introducing the same into a gelling zone in which it is allowed to remain in undisturbed condition to effect the setting thereof.

I claim:

1. An apparatus for treating an inorganic oxide hydrosol to thicken the same, comprising a horizontal open trough, a plurality of weirs dividing the trough into compartments, means for introducing a hydrosol into one end of the trough, said weirs being of varying heights decreasing from the inlet to the discharge end of the trough, and movable agitators within the trough for agitating the hydrosol in the several compartments.

2. An apparatus for thickening an inorganic oxide hydrosol to facilitate setting of the same into a hydrogel, comprising an elongated horizontal open vessel having a shaft extending coaxially therethrough, agitators carried by said shaft, means for introducing a hydrosol into one end of said vessel, means for discharging hydrosol from the other end of said vessel, means for rotating said shaft and agitators for agitating the hydrosol as it flows from one end of the vessel to the other, and a plurality of weir-like partitions decreasing in height from the inlet toward the discharge end of said vessel, dividing said vessel into a plurality of compartments, adapted to contain hydrosol in various degrees of viscosity.

3. An apparatus for treating an inorganic oxide hydrosol to thicken the same comprising an elongated substantially horizontal vessel, a plurality of weirs dividing the vessel into compartments, means for introducing a hydrosol into one end of the vessel, said weirs being of varying heights decreasing from the inlet to the discharge end of the vessel, and movable agitators within the vessel for agitating the hydrosol in the several compartments.

HOWARD H. REYNOLDS.

REFERENCES CITED

The following references are of record in the file of this patent:

UNITED STATES PATENTS

| Number | Name | Date |
| --- | --- | --- |
| 1,868,565 | Connolly | July 26, 1932 |
| 2,232,727 | Peterkin | Feb. 25, 1941 |
| 2,370,200 | Shabaker | Feb. 27, 1945 |

FOREIGN PATENTS

| Number | Country | Date |
| --- | --- | --- |
| 553,736 | Great Britain | June 3, 1943 |